(12) United States Patent
Liu

(10) Patent No.: US 6,204,612 B1
(45) Date of Patent: Mar. 20, 2001

(54) DISCHARGE DEVICE

(75) Inventor: Chu-kuang Liu, Taoyuan (TW)

(73) Assignee: Delta Electronics Inc., Taoyuan Shien (TW)

( * ) Notice: Subject to any disclaimer, the term of this patent is extended or adjusted under 35 U.S.C. 154(b) by 0 days.

(21) Appl. No.: 09/456,351

(22) Filed: Dec. 8, 1999

(30) Foreign Application Priority Data

Aug. 10, 1999 (TW) .................................................. 88113679

(51) Int. Cl.$^7$ .................................................. G05F 1/00
(52) U.S. Cl. ..................................... 315/291; 315/200 R
(58) Field of Search .................... 315/291, 86, 200 R, 315/208, 188, 199; 307/109, 110

(56) References Cited

U.S. PATENT DOCUMENTS

| | | | |
|---|---|---|---|
| 3,714,459 | * 1/1973 | Gerstenberger et al. | 307/141 R |
| 3,869,645 | * 3/1975 | Collins | 315/209 T |
| 3,962,601 | * 6/1976 | Wrzesinski | 315/241 R |
| 3,983,473 | * 9/1976 | Sanderson | 323/22 R |
| 5,422,547 | * 6/1995 | Brownell | 315/307 |
| 6,013,988 | * 1/2000 | Bucks et al. | 315/291 |

* cited by examiner

*Primary Examiner*—Don Wong
*Assistant Examiner*—Thuy Vinh Tran
(74) *Attorney, Agent, or Firm*—Laff, Whitesel & Saret, Ltd.; J. Warren Whitesel

(57) ABSTRACT

A device for discharging charges from a capacitor of a power system is disclosed. The discharge device includes a discharge loop electrically connected to the capacitor for providing a discharging passageway for the charges to be safely discharged therethrough, and a control loop electrically connected to the capacitor for actuating the discharge loop start to discharge at the moment when the power system is suddenly powered off.

12 Claims, 2 Drawing Sheets

DISCHARGE DEVICE

FIELD OF THE INVENTION

The present invention relates to a discharge device, and especially to a discharge device arranged in a power module for discharging charges from the power module when the power module is extracted from a system, which is still powered on.

BACKGROUND OF THE INVENTION

A power module is constituted by many electronic devices modularized together with only one connector, e.g. a golden finger, so that people can use the power module conveniently and easily. Nowadays, the power module is further designed as a live line operating module which can allow that the power module to be extracted from or attached onto a power frame of a power system when the system is not powered off.

However, there exists some risks in operating the conventional live line operating module when the system is not powered off. Taking the conventional live line power supply module for example, while the power supply module is connected to a system, a lot of charges will be stored in capacitors built inside the module. When the power module is suddenly extracted from the system, those charges can not be discharged completely since there is no discharge passageway.

These charges can be very dangerous and harmful. If the golden finger of power supply module unwarily touches the metal part of the system frame while being extracted, the charges will be discharged into the system suddenly and the devices inside the system will be damaged by the unexpectedly large current.

In addition, if the golden finger of power supply module touches a human body, the man will get an electric shock.

It is therefore attempted by the applicant to deal with the above situation encountered with the prior art.

SUMMARY OF THE INVENTION

An object of the present invention is to provide a discharge device arranged in a power system for discharging charges from a capacitor of the power system when the power system is suddenly powered off.

The discharge device includes a discharge loop electrically connected to the capacitor for providing a discharging passageway for the charges to be safely discharged therethrough, and a control loop electrically connected to the capacitor for actuating the discharge loop to discharge said charges when the power system is suddenly powered off.

According to the present invention, the capacitor is used for storing charges when the power system is in use.

According to the present invention, the discharge loop includes a field effect transistor (FET) having a drain terminal connected to a positive pole of the capacitor, and a first resistor having a first terminal connected to a source terminal of the field effect transistor and a second terminal connected to ground and a negative pole of the capacitor.

In accordance with the present invention, the discharge loop further includes a bipolar transistor having a collector terminal connected to a gate terminal of the FET, a base terminal connected to the source terminal of the FET, and a emitter terminal connected to the second terminal of the first resistor for controlling the charges to be discharged with a constant current.

According to the present invention, the control loop includes a Zener diode having a first terminal connected to the gate terminal of the FET, and a second terminal connected to the emitter terminal of the bipolar transistor, and a second resistor connected in parallel with the Zener diode for generating a voltage drop at the gate terminal of the FET to enable the FET and the bipolar transistor to control said charges to be discharged as a constant current.

In accordance with the present invention, the discharge device further includes a second Zener diode and a plurality of resistors serieswoundly connected between the drain terminal and the gate terminal of the FET.

Another object of the present invention is to provide a discharge device arranged in a power module for discharging charges from a capacitor of the power module when the power module is suddenly extracted from a power system which is still powered on.

According to the present invention, the discharge device includes a discharge loop electrically connected to the capacitor for providing a discharging passageway for the charges to be safely discharged therethrough, and a control loop electrically connected to the capacitor for actuating the discharge loop start to discharge when the power module is suddenly extracted from the power system.

In accordance with the present invention, the power system includes a system frame for allowing the discharge module to be attached therein.

Preferably, the power module of the present invention is a live line operating module, such as a live line power supply module.

The present invention may best be understood through the following description with reference to the accompanying drawings, in which:

DETAILED DESCRIPTION OF THE PREFERRED EMBODIMENTS

Figure 1:
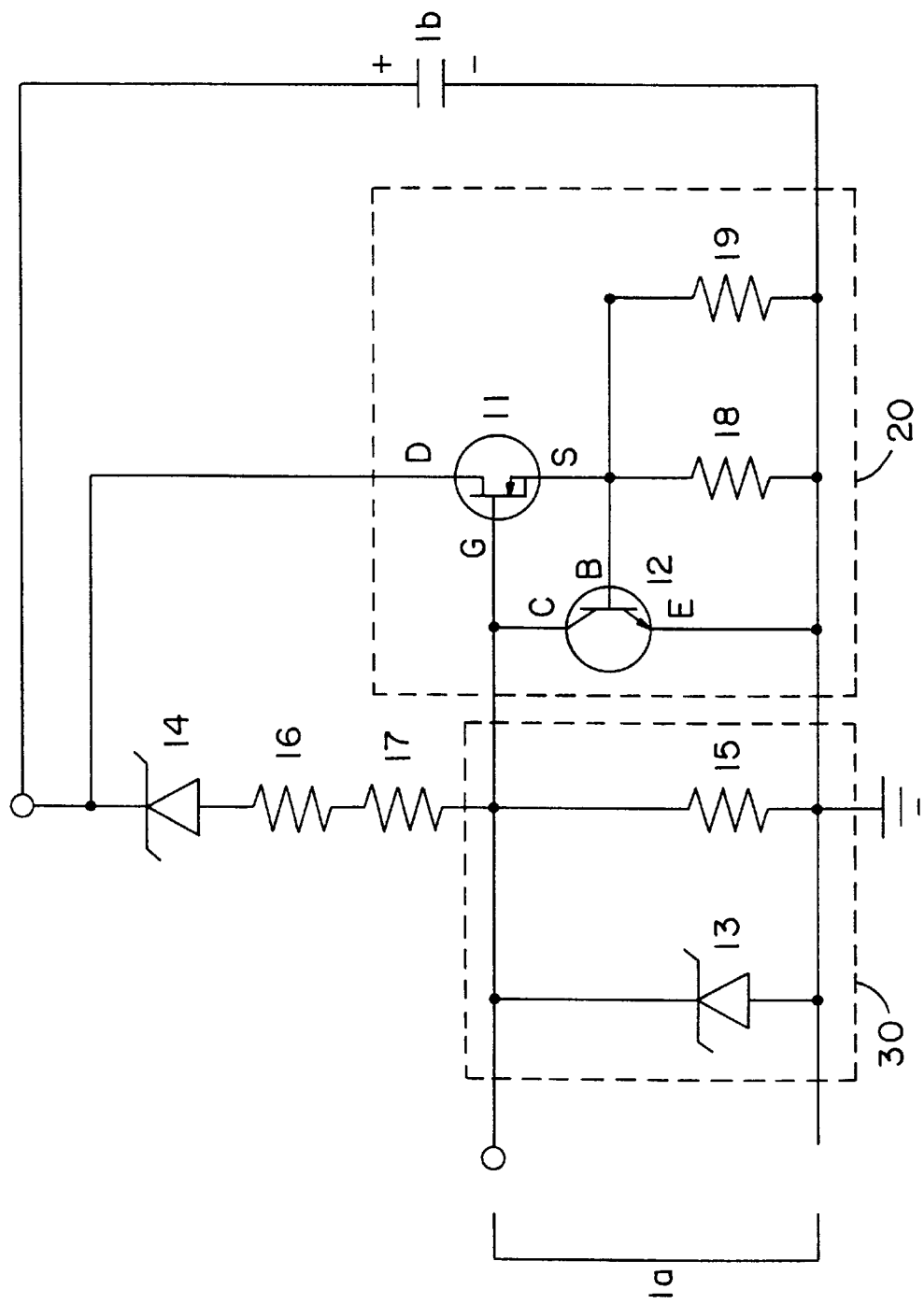
FIG. 1 is a circuit diagram showing the discharge device of the present invention.

FIG. 1 is a circuit diagram showing the discharge device of the present invention. The discharge device of the present invention is designed for discharging charges from capacitors of a power module each time the power module is suddenly extracted from a power system which is still powered on. Therefore, the charges retained in the capacitors of a power module or a power system can be discharged safely so as to prevent damages of the system and protect users.

The discharge device of the present invention includes a discharge loop 20 electrically connected to a capacitor 1b for providing a discharging passageway for the charges stored in the capacitor 20 to be safely discharged therethrough, and a control loop 30 electrically connected to the capacitor 1b for actuating the discharge loop 20 to discharge when the power module is extracted from a power system which is still powered on (i.e. when the conductor 1a is disconnected from the control loop 30).

The discharge loop 20 includes a field effect transistor (FET) 11 having a drain terminal D connected to a positive pole (+) of the capacitor 1b, and a first resistor 18 having a first terminal connected to a source terminal S of the FET 11 and a second terminal connected to ground and a negative pole (−) of the capacitor 1b. The discharge loop 20 further includes a bipolar transistor 12 having a collector terminal C connected to a gate terminal G of the FET 11, a base terminal B connected to the source terminal S of the FET 11, and an emitter terminal E connected to the second terminal of the first resistor 18 for controlling the charges to be discharged as a constant current.

The control loop 30 includes a Zener diode 13 having a first terminal connected to the gate terminal G of the FET 11, a second terminal connected to the emitter terminal E of the bipolar transistor 12 for generating a voltage drop to enable the FET 11 and the bipolar transistor 12 to function when the power system is suddenly powered off, and a second resistor 15 connected in parallel with the Zener diode 13.

The control loop 30 of the discharge device of the present invention may further include a second Zener diode 14 and a plurality of resistors 16, 17 connected between the drain terminal D and the gate terminal G of the FET 11 in series. In addition, the discharge loop 20 may further include other resistors 19 connected in parallel with the first resistor 18.

When the power system is powered on and the power module has not been extracted from the power system (i.e. when the conductor 1a is connected to the control loop 30), the discharge loop 20 and the control loop 30 are short-circuited. The discharging passageway does not exist and some charges will be stored in the capacitor 1b of the power system.

When the power module is extracted from the power system while the power system is still powered on (i.e. when the conductor 1a is disconnected from the control loop 30), the capacitor 1b starts to discharge charges. The current flows through the Zener diode 14, the resistors 16 and 17, the Zener diode 13 and the resistor 15 respectively. After the current flow through resistor 15, the resistor 15 will generate a voltage drop at the gate terminal G of the field effect transistor (FET) 11. Therefore, the FET 11 becomes conductive so that the current will be discharged to ground through the resistors 18 and 19.

At the same time, the bipolar transistor 12 also becomes conductive by the voltage drop. The bipolar transistor 12 can control the FET 11 to discharge charges as a constant current. Therefore, the charges are discharged safely and quickly.

Figure 2:
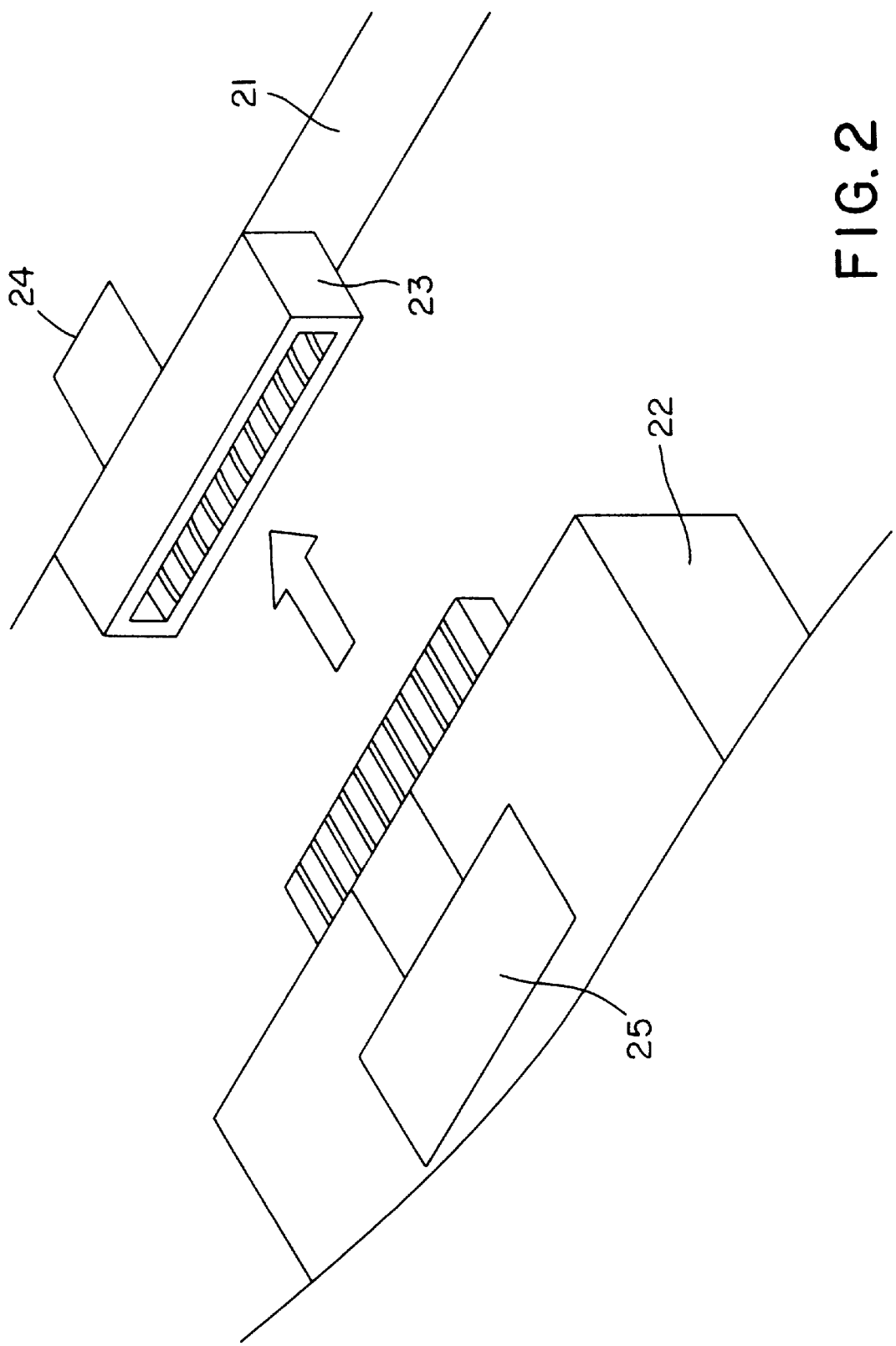
FIG. 2 schematically shows the system frame and the power module having a discharge device according to the present invention.

The discharge device can also be used in a power module, preferably a live line operating module, for discharging charges when the power module is suddenly extracted from a system frame of a system which is still powered on. FIG. 2 schematically shows the system frame 21 and the power module 22 having a discharge device 25 according to the present invention. The system frame 21 including a socket 23 is used for allowing the power module 22 to be attached therein. A conducting device 24, which functions as the conductor 1a in FIG. 1, is contained in the socket 23.

When the power module 22 is connected to the system which is powered on through the socket 23 (i.e. the conductor 1a and the power module 22 are connected), some charges will be stored in the capacitors of the power module 22. Therefore, after the power module 22 is disconnected from the system (i.e. the conductor 1a and the power module 22 are not connected), the discharge device 25 will start to discharge charges stored in the capacitors of the power module 22.

In conclusion, the discharge device of the present invention can discharge charges retained in the power module safely and quickly. Therefore, the electronic devices of the power system and power module will not be damaged by the unexpectedly large discharging current and users will not get an electric shock.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A discharge device arranged in a power module for discharging charges from a capacitor of said power module each time said power module is suddenly extracted from a power system which is still powered on, comprising:

a discharge loop electrically connected to said capacitor for providing a discharging passageway for said charges to be safely discharged therethrough; and a control loop electrically connected to said capacitor for actuating said discharge loop to discharge when said module is suddenly extracted from said power system;

said control loop being short-circuited while said power module is still connected to said power system in order to prevent said capacitor from discharging.

2. The discharge device according to claim 1, wherein said capacitor is used for storing said charges when said power module is in use.

3. The discharge device according to claim 1, wherein said power system includes a system frame for allowing said discharge module to be attached therein.

4. The discharge device according to claim 3, wherein said discharge loop comprises:

a field effect transistor (FET) having a drain terminal connected to a positive pole of said capacitor; and a first resistor having a first terminal connected to a source terminal of said FET and a second terminal connected to ground and a negative pole of said capacitor.

5. The discharge device according to claim 4, wherein said discharge loop further comprises a bipolar transistor having a collector terminal connected to a gate terminal of said FET, a base terminal connected to said source terminal of said FET, and an emitter terminal connected to said second terminal of said first resistor for controlling said charges to be discharged as a constant current.

6. The discharge device according to claim 5, wherein said control loop comprises:

a Zener diode having a first terminal connected to said gate terminal of said FET, and a second terminal connected to said emitter terminal of said bipolar transistor; and a second resistor connected in parallel with said Zener diode for generating a voltage drop at said gate terminal of said FET to enable said FET and said bipolar transistor to control said charges to be discharged as a constant current.

7. The discharge device according to claim 6, wherein said control loop further comprises a second Zener diode and a plurality of resistors connected between said drain terminal and said gate terminal of said FET in series.

8. The discharge device according to claim 1, wherein said power module is a live line operating module.

9. The discharge device according to claim 8, wherein said live line operating module is a live line power supply module.

10. A discharge device arranged in a power module for discharging charges from a capacitor of said power module when said power module is suddenly extracted from a power system which is still powered on, said discharge device comprising a discharge loop electrically connected to said capacitor for providing a discharging passageway for said charges to be safely discharged therethrough, wherein said discharge loop comprises:

- a field effect transistor (FET) having a drain terminal connected to a positive pole of said capacitor;
- a first resistor having a first terminal connected to a source terminal of said FET and a second terminal connected to ground and a negative pole of said capacitor; and
- a bipolar transistor having a collected terminal of said FET, and an emitter terminal connected to said second terminal of said first resistor for controlling said charges to be discharged as a constant current.

11. The discharge device according to claim 10 further comprising a control loop electrically connected to said capacitor for actuating said discharge loop to discharge when said power module is suddenly extracted from said power system, wherein said control loop comprises:

- a Zener diode having a first terminal connected to said gate terminal of said FET, and a second terminal connected to said emitter terminal of said bipolar transistor for generating a voltage drop to enable said FET and said bipolar transistor to control said charges to be discharged as a constant current when said power module is suddenly extracted from said power system; and
- a second resistor connected in parallel with said Zener diode.

12. The discharge device according to claim 11, wherein said control loop further comprises a second Zener diode and a plurality of resistors connected between said drain terminal and said gate terminal of said FET in series.

* * * * *